UNITED STATES PATENT OFFICE.

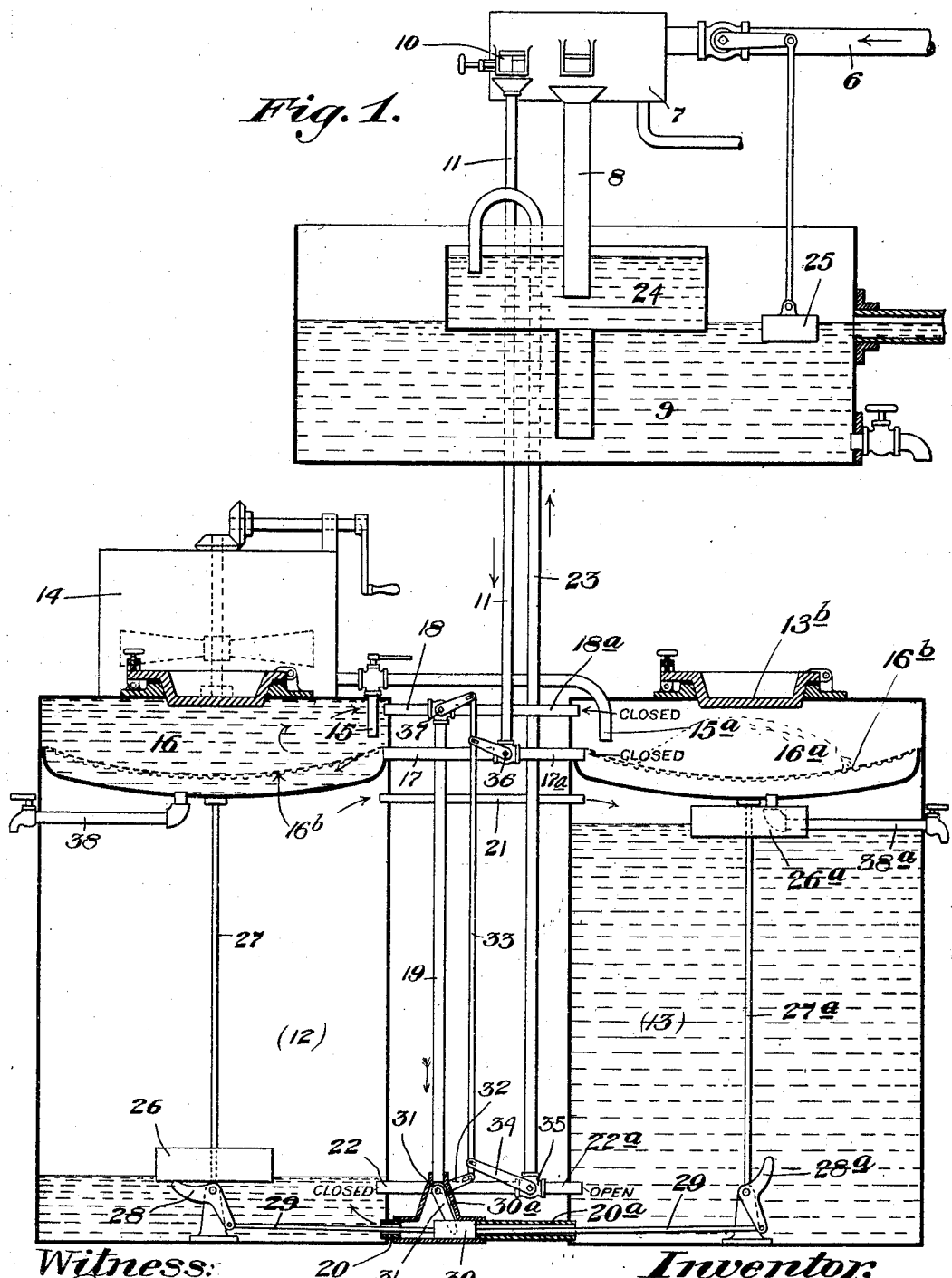

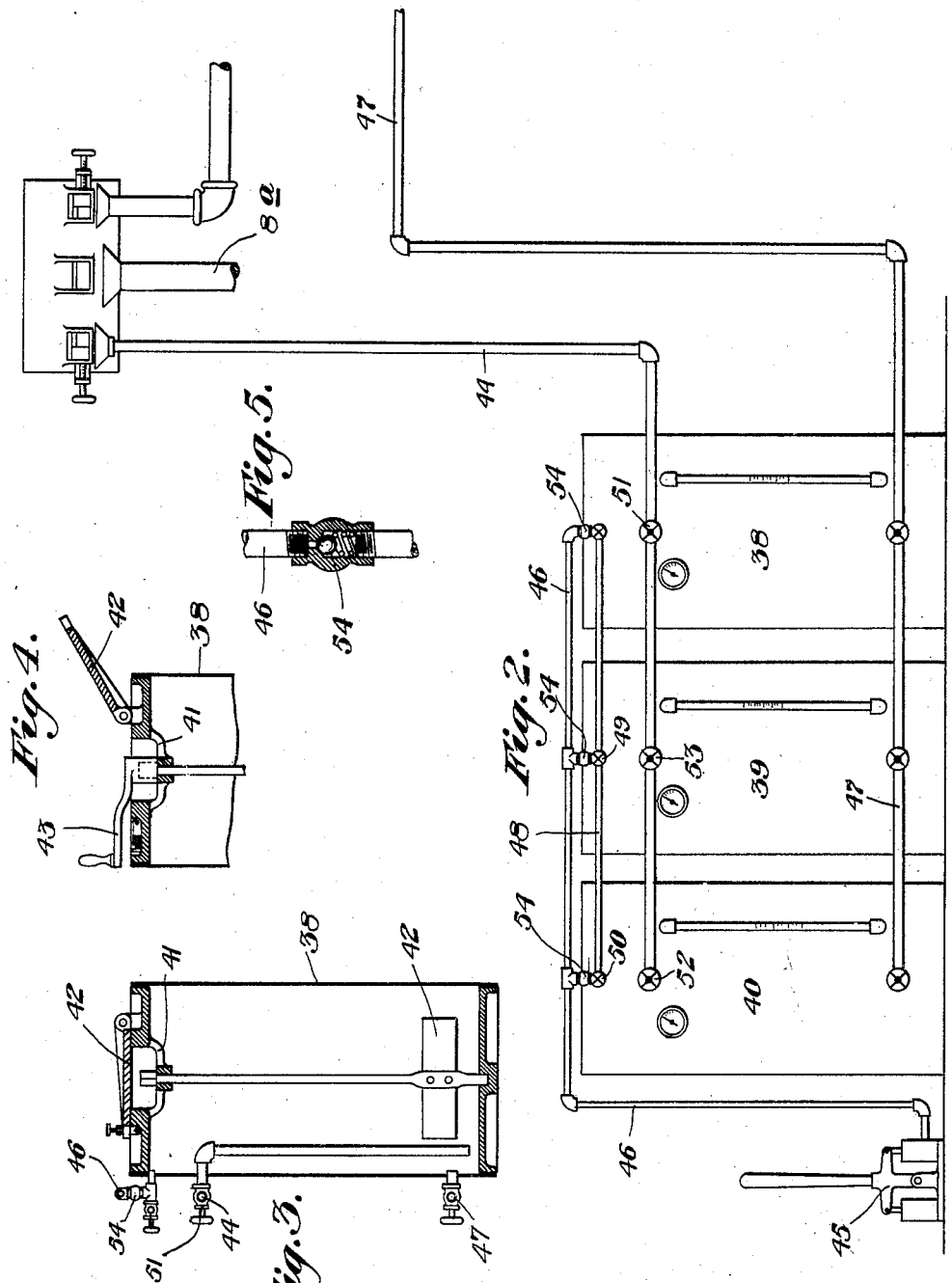

DUNCAN W. PATTERSON, OF PHILADELPHIA, PENNSYLVANIA.

FEEDING DEVICE FOR WATER-PURIFYING APPARATUS.

940,402.  Specification of Letters Patent.  Patented Nov. 16, 1909.

Application filed March 26, 1907. Serial No. 364,630.

*To all whom it may concern:*

Be it known that I, DUNCAN W. PATTERSON, a citizen of the United States, residing at Philadelphia, in the State of Pennsylvania, have invented certain new and useful Improvements in Feeding Devices for Water-Purifying Apparatus, of which the following is a specification.

My invention relates to such processes as water purification, where it is desirable to supply a definite proportion of a chemical reagent to the water at a definite rate.

The principal objects of the invention are to conveniently accomplish this, and make the feed certain and easily regulable; to provide for introducing the reagent into the system from the ground, or a point below the level of distribution of the water, without the use of pumps; to maintain a constant feed of constant strength of the chemical solution, and to make the feeding devices automatic. These objects, as well as other advantages which will hereinafter appear, I attain by means of the construction illustrated in preferred forms in the accompanying drawings.

Figure 1 is a partial vertical sectional view of my air displacement feeder as applied to a water softening system. Fig. 2 is a diagram of a modification showing different arrangements of the feeding tanks. Figs. 3 and 4 are partial sections showing the construction of the top of the tank and Fig. 5 shows the valve in the feed pipe.

In water softening and purifying apparatus it is customary to add various chemical reagents such as the soluble sodium carbonate to the water as it passes through the apparatus, for purposes of precipitating certain impurities, softening, etc. Generally a solution of the soda is mixed and manually introduced in certain parts of the apparatus at intervals; this of course must be placed above the point of distribution of the water or else pumps must be employed to raise it to the usual elevated tank for reaction and storage. In order to make this operation uniform, certain and automatic I use the principle of air displacement for raising the mixture from the ground by the force of the water flowing into the apparatus. Thus, referring first to Fig. 1, it will be understood that the main supply pipe 6 may empty into a weir box 7 which has one weir emptying through the pipe 8 into any re-action or storage tank 9. Another, and an adjustable weir, 10, introduces into the system through the pipe 11 the required portion of feed water, regulated as desired at a certain ratio with the main flow through the pipe 8. The reaction and storage tanks may be elevated, and for convenience I place upon the ground pairs of twin displacement tanks (12 and 13) for feeding any of the chemicals to the entire system.

From the lower part of Fig. 1 it will appear that there is a chemical mixer 14, of any desired form, and from it, by means of pipe 15 the reagent is drawn into the compartment 16 in the top of the tank 12. The water from the pipe 11 is now allowed to run in through the valve 36 and branch pipe 17, filling the compartment 16 and carrying out with it through the pipes 18, 19, 20, a stream of water having the chemical diluted and mixed with it. This empties through the valve casing 30ª into the tank 12, and as the water level therein rises the air confined in the tank 12 will be driven out through an open air pipe 21 into the top of the tank 13 (which has previously been filled in a similar manner). This air is under pressure by reason of the head of water and will force down the level of the water in tank 13 and force the water out through the branch 22ª and valve 35 of a feed pipe 23, from whence it flows into a receiving vessel 24 and tank 9 and is mixed with the main supply of water from pipe 8. The water may be then drawn from this reaction tank to be further treated and used as desired. Ordinarily I prefer to use a float 25 operating a valve in the main pipe 6 so that the entire supply of water in pipes 8 and 11 will be regulated by the amount drawn off for use. While the tank 13 is being emptied, a new charge of chemical can be introduced into compartment 16ª by means of pipe 15ª, the water filling the compartment being first emptied by pipe 38ª when desired. Otherwise, the chemical can be placed in 16ª through a door directly. That is, the chemical in a solid state may be placed upon the screen 16ᵇ, the compartment 16ª being completely filled with water and chemical before the door 13ᵇ is sealed down, so as to lose no air pressure.

It will be understood from the drawing that as the water level in the tank 13 falls the float 26ª, guided on its rod 27ª, will finally rest upon the tripping lever 28ª and this by means of a rod 29 will push over the valve 30 in the casing 30ª at the lower end of the supply pipe 19; this closes the inlet 20 to tank 12 and opens the inlet 20ª to tank 13 (the float 26 having been meanwhile lifted off from the trip 28 by the rise of the water in tank 12). The valve 30 may be some form of slide valve as shown and there is attached to it an arm 31 which is pivoted in the casing 30ª on a shaft 31 carrying also a lever arm 32 attached to a vertical moving rod 33. The rod 33 in turn operates the handle 34 of valve 35 controlling the branches 22, 22ª, of the outlet or feed pipe 23. This opens branch 22 to tank 12 and closes branch 22ª. The rod 33 also operates valve 36 of the supply pipe, which at the proper time closes the branch 17 feeding tank 12, and opens branch 17ª to tank 13, now empty. At the same time the rod 33 by valve 37 closes the branch 18 and opens the branch 18ª of the main pipe 19, admitting the flow to the bottom of tank 13. It will be understood of course that in the meanwhile the soda solution and new water has completely filled the compartment 16ª on top of tank 13.

The operation of the above described device will be evident. The water continuously flows down the pipe 11, alternately through the compartment 16 and pipe 19 into the tank 12 and then through the compartment 16ª and down the pipe 19 into the tank 13. The air pressure in the two tanks 12 and 13 remains the same and the air is alternately displaced from one and forced into the other, so as to empty these tanks in alternation outward through the feed pipe 23. This apparatus can therefore work at any distance from the receiving tank 9, which is usually elevated; it is highly desirable to put the chemical mixer on the ground where it can be easily reached. The feeding of the chemical alternately into the compartments 16 and 16ª may of course be accomplished by hand if desired. In order to reserve the pressure maintained in the twin tanks and the pipe 19, it will be noticed that when the flow into one of the tanks such as 12 has been completed, the shifting of the valves 36 and 37 shuts off any back flow into compartment 16, and just enough of the water therein can be removed by means of the tap pipe 38, to make room for the reception of a new charge of the chemical through the pipe 15 from the mixer 14, or through a door, and the compartment volume containing no air is invariable and no pressure is lost. Gage glasses may be used when desired to observe the level of water in the tanks.

One of the essential features of the above described apparatus is the fluid displacement used to raise the mixed water and chemical to the distributing reservoir, and incidently the means for uniform mixing of the chemical in the water during this process. The same result may be attained without the automatic features, and in various ways; in some instances I prefer to use the apparatus illustrated in the second sheet of drawings.

The three tanks shown in Fig. 2 are of essentially the construction shown by the cross section of Fig. 3, in which the tank 38 is provided with a top having a grated opening 41 closed by hinged door 42, for introduction of the chemical in a solid form if desired. The tank is provided with paddles 42 which are operated by crank 43 as shown in Fig. 4, when the door is opened, in order to stir up and mix the chemical with the water introduced therein. The water flowing from a weir box as before described through the pipe 44 proportional to the flow in the main pipe 8ª, empties into any one of the three mixing tanks, the inlet pipe as shown in Fig. 3 having a branch into the bottom of the tank. While the tank 38 for example is being charged with a requisite quantity of soda or other chemical necessary for a desired period of operation, the tanks 39 and 40 will be in service, 40 being filled with a soda solution while 39 is practically empty.

All the tanks are provided with air pressure by means of a pump 45 and air pipe 46 having branches in each tank, so that the pressure is made in all equal to the head of water in the outlet pipe 47 as will be understood. By means of a supplementary air pipe 48 and proper valves 49, 50, the air in the two tanks 39 and 40 is in communication. Supposing the valves 51 and 52 to be closed and valve 53 open, as the water flows into tank 39 the air will be driven over through pipe 48 into the tank 40, forcing the solution out of the same through the pipe 47 to be delivered to the point of discharge. If desired gage glasses may be provided on the sides of the tank to show the pressure. The operation is in general similar to that before described in the apparatus of the Fig. 1; but it will be understood while two of the tanks are in use, the first tank 38 has been charged with chemical and the pressure is separately raised to the proper figure by means of the pipe 46, the gages of the three tanks being made to read alike. In the inlet pipes are preferably provided check valves as shown at 54 in Fig. 5 to prevent any back flow.

The operation of this apparatus will be clearly understood from the above description.

It will be evident that the tanks as illustrated in Fig. 1 may be used in any extended series in place of the tanks illustrated in Fig. 3, so that the top compartment of each tank being filled with water the door of the chemical compartment may be opened without loss of air pressure, and the chemical placed therein and mixed, after which the door is closed and the operation continues; and it will be observed that in the series of tanks illustrated in Fig. 3 the stream of incoming water can be shifted to the next tank in series whenever any one of the tanks is filled. Thus if it is desired to put in the chemical by hand one tank of the series can be filling while another is emptying, and a third being out of action can meantime be charged with the chemical. In such case the air pump illustrated in Fig. 2 will not be necessary, as the air pressure is always preserved by shifting from one tank to another in series and whenever the compartment is opened to introduce the chemical said compartment is already filled with water which being incompressible does not result in loss of pressure.

While I have described the devices as applied to water purifying systems, they are of course equally applicable to any apparatus where it is desired to feed in a proportional amount of chemical and raise it to any height by means of the water pressure from the still higher supply. The various advantages of the devices will readily occur to those skilled in the art.

Having thus described my invention and illustrated its use, what I claim as new and desire to secure by Letters Patent, is the following:

1. In a feeding device the combination of a plurality of closed tanks and means to introduce into each of them in turn a supply of water under head, means to mix a chemical in the water, and means to conduct the displaced air in such tank to the next tank in turn, to thereby drive out water in the latter and elevate it, substantially as described.

2. The combination of a series of tanks having means to mix a chemical therein and empty the tank without loss of air pressure therein, proper connections and valves to introduce the air displaced in one tank of the series and to allow the consequent escape of water contained therein under pressure.

3. A series of closed tanks having means to mix chemicals therein and fill each tank with water, automatic means to shift the incoming stream of water to another tank when the first is full, means to preserve air pressure in each tank while filling and emptying, and means to conduct the air from each tank as it fills to the next in series, to displace the water therein under head.

4. The combination with an elevated water supply and a receiving reservoir, of a plurality of tanks placed below the reservoir, said tanks being air connected and some of them filled with air, proper pipes and valves to admit water into each tank and drive the air into another, and thereby displace fluid contained therein and raise it to said reservoir, substantially as described.

5. In a water purifying apparatus the combination of a plurality of closed air-connected chemical feeding tanks, a water supply under head, and proper valves and connections adapted to fill one of the tanks with water and thereby drive the air into another tank, of the series to thereby displace and elevate the water therein.

6. In a feeding device a pair of displacement tanks having each a chemical compartment and an air chamber, means to introduce the chemical into its compartment without relieving pressure in the air chamber, and an elevated supply and means to cause a flow of water through the chemical compartment into the air chamber of one tank and convey the air to discharge the water in the other tank by consequent displacement by the air.

7. A feeding device comprising a plurality of closed tanks, each having a compartment for introducing a chemical and a chamber partly filled with air, a water supply, pipes and proper valves to cause a flow of water through the chemical compartment into the air chamber of one tank, an air pipe to conduct the displaced air to another tank and cause displacement of the water therein and a feed pipe to carry off said water, said pipes and valves being adapted to connect alternately with the several tanks.

8. The combination with a successively operating series of closed tanks, of a water supply under head and means to fill and then expel the water from each one of the tanks after filling, by air pressure impelled by water introduced into the next preceding tank and automatic means for shifting the flow of water into the several tanks in turn, for this purpose, substantially as described.

9. The combination with a tank having a chemical compartment and a closed air chamber, of a water supply and proper connections and valves for introducing water under head into the chemical compartment and discharging the water and chemical therefrom into the air chamber, and means for afterward forcing air into this latter chamber to expel the water therein, substantially as described.

10. The combination with a water supply and a receiving tank, of a pair of feed tanks below the level of the supply and receiving tank, said feeding tanks being closed and having closed chemical compartments and air chambers, the latter with air connections with each other, means for introducing water into one of said tanks whereby to expel the air and thereby expel the water in the other tank, and suitable valves and automatic means for operating them to fill and empty the tanks as and for the purpose set forth.

11. The combination with a water supply, of two closed double compartment tanks, a valve to alternately switch said water supply into said tanks, a supplementary pipe connecting air spaces in the two tanks, whereby the rising of water level in one of them will by air pressure force down the water level in the other, an outlet valve for emptying each tank, and automatic means for operating the valves for inlet and outlet, substantially as set forth.

12. A feeding device for water purifying apparatus comprising a plurality of closed tanks and proper valves and connections to alternately fill the same with water, a connecting air pipe between the tanks, an elevated water supply, an elevated receiving reservoir, and means for simultaneously introducing a chemical and water into each of the tanks in alternation, whereby the air displacement empties another tank into the elevated reservoir under pressure, substantially as described.

13. In feeding apparatus a closed tank having a chemical compartment and a compressed air chamber, a water supply and means to cause a flow of water through the chemical compartment into the air chamber and means to introduce the chemical into its compartment without relieving pressure in the air chamber, substantially as described.

14. The combination of a chemical supply, a series of mixing chambers, an elevated water supply, means to continuously introduce the chemical and water under head into said mixing chambers in alternation, and means to expel the treated water by air displacement and elevate it for use, substantially as described.

15. In water purifying apparatus a feeding device for chemical reagents comprising a closed vessel with a compartment for the chemical, a compartment for the mixed water and chemical connected thereto, a connection to let water into the chemical compartment and automatic means to start the inflow when the vessel is empty.

In testimony whereof I have hereunto signed my name in the presence of two subscribed witnesses.

DUNCAN W. PATTERSON.

In presence of—
 FRANCIS P. MALONE,
 E. F. REMENTER.